(12) United States Patent
Kwon et al.

(10) Patent No.: US 12,458,723 B2
(45) Date of Patent: Nov. 4, 2025

(54) ENERGY-INDEPENDENT WATER-BASED PURE AIR CLEANING SYSTEM USING WATER ELECTROLYTIC-FUEL CELL

(71) Applicant: KWaterCraft Co., Ltd., Busan (KR)

(72) Inventors: Yujin Kwon, Busan (KR); Nam Ju Cho, Gyeongsangnam-do (KR); Myeong Seok Jeong, Busan (KR)

(73) Assignee: KWATERCRAFT CO., LTD., Busan (KR)

( * ) Notice: Subject to any disclaimer, the term of this patent is extended or adjusted under 35 U.S.C. 154(b) by 1084 days.

(21) Appl. No.: 17/310,674

(22) PCT Filed: Jun. 5, 2019

(86) PCT No.: PCT/KR2019/006780
§ 371 (c)(1),
(2) Date: Aug. 17, 2021

(87) PCT Pub. No.: WO2020/179973
PCT Pub. Date: Sep. 10, 2020

(65) Prior Publication Data
US 2022/0118146 A1    Apr. 21, 2022

(30) Foreign Application Priority Data

Mar. 7, 2019 (KR) .................. 10-2019-0026212

(51) Int. Cl.
*C25B 1/02*    (2006.01)
*A61L 9/14*    (2006.01)
(Continued)

(52) U.S. Cl.
CPC ........ *A61L 9/14* (2013.01); *F24F 6/02* (2013.01); *F24F 6/14* (2013.01); *F24F 8/60* (2021.01); *A61L 2209/213* (2013.01)

(58) Field of Classification Search
CPC ........ A61L 9/14; A61L 2209/213; F24F 8/60; F24F 6/02; F24F 6/14
See application file for complete search history.

(56) References Cited

U.S. PATENT DOCUMENTS 8,347,645 B1 * 1/2013 Miller ............... H01M 8/04231
62/238.7
2017/0007954 A1    1/2017 Ehdaie

FOREIGN PATENT DOCUMENTS

JP    2001 035503 A    2/2001
JP    2004 165086 A    6/2004
(Continued)

*Primary Examiner* — Zulmariam Mendez
(74) *Attorney, Agent, or Firm* — Boisbrun Hofman, PLLC

(57) ABSTRACT

An energy-independent water-based pure air cleaning system using a water electrolytic-fuel cell is disclosed. The energy-independent water-based pure air cleaning system using a water electrolytic-fuel cell proposed by the present invention comprises: a water electrolysis unit that generates hydrogen and oxygen through a water electrolysis treatment using supplied water, and supplies hydrogen gas to an energy generating unit by adjusting the pressure of the generated hydrogen gas; the energy generating unit that generates electrical energy on the basis of the hydrogen gas supplied for use as a power source for air purification; an energy storage unit that does not need energy charging and supplies the generated electrical energy as power for air purification; an oxygen exhaust port for discharging the oxygen generated in the water electrolysis unit for air purification; and a humidifier that generates water vapor by spraying or evaporating the supplied water by any one of ultrasonic vibration, heating, natural evaporation, or nozzles to control the humidity in a room.

1 Claim, 3 Drawing Sheets

(51) Int. Cl.
*F24F 6/02* (2006.01)
*F24F 6/14* (2006.01)
*F24F 8/60* (2021.01)

(56) References Cited

FOREIGN PATENT DOCUMENTS

| | | |
|---|---|---|
| JP | 2004 261757 A | 9/2004 |
| KR | 10 2005 0054125 A | 6/2005 |
| KR | 10 2005 0075628 B1 | 7/2005 |
| KR | 10 2017 0008401 A | 1/2017 |
| WO | 2020179973 A1 | 9/2020 |

* cited by examiner

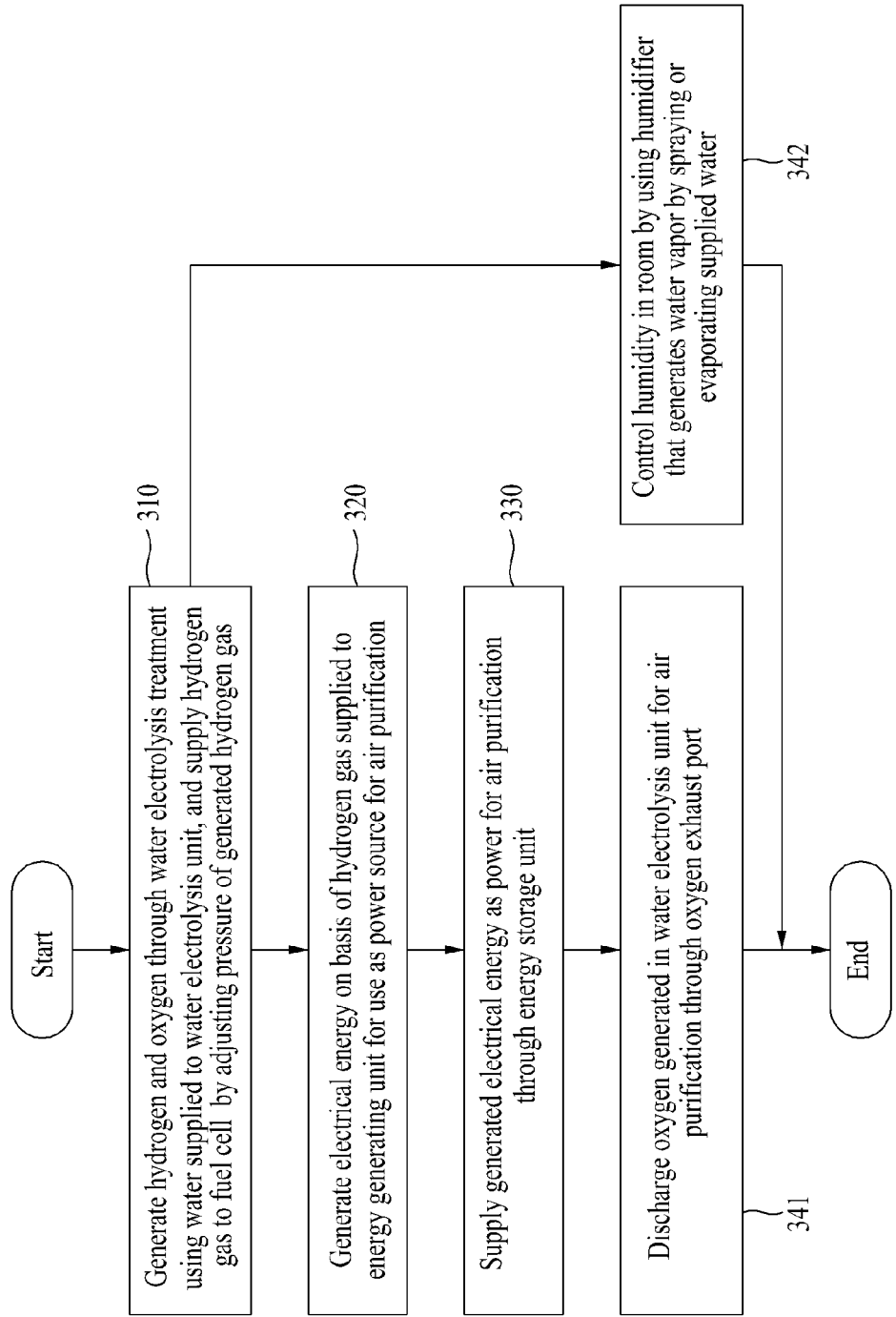

ENERGY-INDEPENDENT WATER-BASED PURE AIR CLEANING SYSTEM USING WATER ELECTROLYTIC-FUEL CELL

CROSS-REFERENCES TO RELATED APPLICATION

This application is based on and claims priority under 35 U.S.C. 119 to Korean Patent Application No. 10-2019-0026212, filed on 7 Mar. 2019 in the Korean intellectual property office, the disclosures of which are herein incorporated by reference in its entirety.

TECHNICAL FIELD

The present disclosure relates to an energy-independent water-based pure air cleaning system using a water electrolytic-fuel cell.

BACKGROUND OF THE INVENTION

Water electrolysis (electrolysis) systems are systems that electrochemically decompose water into oxygen and hydrogen. They are drawing attention as a hydrogen production technology because of benefits such as simple operating conditions, small volume, and high purity hydrogen, compared to other hydrogen production methods. Typical methods of water electrolysis in the field of water electrolysis include solid oxide electrolysis (SOE), polymer electrolyte membrane electrolysis (PEME), alkaline electrolysis (AE), etc.

In the field of water electrolysis, high-temperature steam electrolysis is a method that uses a phenomenon in which electrical energy required to decompose water decreases further at higher temperatures. This method allows for highly efficient water decomposition with a small amount of electrical energy and enables two-way operation because of the same structure and principle as solid oxide fuel cells (SOFC).

A fuel cell is a method of producing electricity through an electrochemical reaction between oxygen and hydrogen, which is considered as one of the alternative energy technologies because it creates less environmental pollution and is more energy-efficient than an internal combustion engine. Notably, water electrolysis treatment units, which produce oxygen by electrolyzing water, is gaining spotlight for its environmentally-friendly aspect of only emitting by-product oxygen, as well as for its near-100% hydrogen purity.

Polymer electrolyte membrane fuel cells (PEMFC) are continuously growing with a wide range of power supply and a variety of applications. Through the 2013 revision of a guideline on supporting renewable energy facilities, an energy yield and a correction coefficient of 6.5 were designated. Accordingly, the installation of renewable energy facilities in public institutions became mandatory, and these facilities are being rapidly introduced into the private marketplace.

Among the fields of fuel cell applications, fuel cells for transportation are focused on the vehicle market. Doosan Fuel Cell, which merged with ClearEdge Power, is focusing on the production of fuel cells used to power buildings and vehicles. Hyundai Motor Company has been manufacturing hydrogen-powered electric cars since January, 2018.

Korea Institute of Energy Research developed a flat tube-type high-temperature water electrolysis hydrogen production technology capable of reusing waste heat and steam of high temperature and high pressure. Ulsan National Institute of Science and Technology developed a solid oxide water electrolysis cell which produces 0.9 L of hydrogen for one hour by using two layers of perovskite as fuel electrode (anode) and air electrode (cathode)

Korean Laid-Open Patent Publication No. 10-2005-0075628 relates to a high-temperature methane reforming-type hybrid water electrolysis treatment unit, and discloses a technology for efficiently using energy and reducing energy consumption, compared to the existing water electrolysis treatment units, which is configured to produce hydrogen through both a steam reforming reaction of methane and a high-temperature water electrolysis reaction and to use heat generated by an autothermal reaction of methane and heat generated by a complete oxidation reaction or partial oxidation reaction of methane, for a water electrolyzer which requires a high-temperature operating condition.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A technical aspect of the present disclosure is to provide an energy-independent water-based pure air cleaning system using a water electrolytic-fuel cell which reduces the use of chemical fuels on a national scale, utilizes environmentally-friendly alternative energy, and supplies by-product oxygen by using hydrogen produced through water electrolysis as a power source for an air cleaner, aimed at reducing greenhouse gas reductions to deal with climate change and carrying out mandatory adaptation to climate change.

In one aspect, there is provided an energy-independent water-based pure air cleaning system using a water electrolytic-fuel cell, the system including: a water electrolysis unit that generates hydrogen and oxygen through a water electrolysis treatment using supplied water, and supplies hydrogen gas to an energy generating unit by adjusting the pressure of the generated hydrogen gas; the energy generating unit that generates electrical energy on the basis of the hydrogen gas supplied for use as a power source for air purification; an energy storage unit that does not need energy charging and supplies the generated electrical energy as power for air purification; an oxygen exhaust port for discharging the oxygen generated in the water electrolysis unit for air purification; and a humidifier that generates water vapor by spraying or evaporating the supplied water by any one of ultrasonic vibration, heating, natural evaporation, or nozzles to control the humidity in a room.

The water electrolysis unit may include: a solar panel for supplying electric power required at an early stage of the water electrolysis treatment using solar energy and utilizing the same as standby power; a water electrolysis treatment unit for generating oxygen and clean hydrogen gas from filtered and purified water through hydrogen electrolysis using solar energy; a gas control unit for adjusting the pressure of the hydrogen gas produced through the water electrolysis treatment and supplying the hydrogen gas; a hydrogen refining unit for converting the generated hydrogen into clean hydrogen gas with high purity through a hydrogen refining process using an adsorbent; and a hydrogen storage unit for storing the refined hydrogen gas.

The energy generating unit may produce electricity through an electrochemical reaction between oxygen and the hydrogen gas produced through the water electrolysis treatment and converted into clean hydrogen gas with high purity through the hydrogen refining process, by using a fuel cell.

The oxygen exhaust port may discharge the oxygen generated in the water electrolysis unit via a fan so as to be distributed In another aspect, there is provided a power supply method for an energy-independent water-based pure air cleaning system using a water electrolytic-fuel cell, the method including: generating hydrogen and oxygen through a water electrolysis treatment using water supplied to a water electrolysis unit, and supplying hydrogen gas to an energy generating unit by adjusting the pressure of the generated hydrogen gas; generating electrical energy on the basis of the hydrogen gas supplied to the energy generating unit for use as a power source for air purification; supplying the generated electrical energy as power for air purification through an energy storage unit; discharging the oxygen generated in the water electrolysis unit for air purification through an oxygen exhaust port; and controlling the humidity in a room by using a humidifier that generates water vapor by spraying or evaporating the supplied water by any one of ultrasonic vibration, heating, natural evaporation, or nozzles.

In the generating of hydrogen and oxygen through a water electrolysis treatment using water supplied to a water electrolysis unit, and the supplying of hydrogen gas to an energy generating unit by adjusting the pressure of the generated hydrogen gas, electric power required at an early stage of the water electrolysis treatment may be supplied using solar energy and utilized as standby power, oxygen and clean hydrogen may be generated from filtered and purified water through hydrogen electrolysis using solar energy, the pressure of the hydrogen gas produced through the water electrolysis treatment may be adjusted, and the generated hydrogen may be converted into clean hydrogen gas with high purity through a hydrogen refining process using an adsorbent and then stored.

In the generating of electrical energy on the basis of the hydrogen gas supplied to the energy generating unit for use as a power source for air purification, electricity may be produced through an electrochemical reaction between oxygen and the hydrogen gas produced through the water electrolysis treatment and converted into clean hydrogen gas with high purity through the hydrogen refining process, by using a fuel cell.

In the discharging of the oxygen generated in the water electrolysis unit for air purification through an oxygen exhaust port, the oxygen generated in the water electrolysis unit may be discharged via a fan so as to be distributed.

According to embodiments of the present disclosure, there is provided an energy-independent water-based pure air cleaning system using a water electrolytic-fuel cell which provides fresh air into a room and adjusts the humidity in the room by utilizing an oxygen-generating air cleaner that reduces the use of chemical fuels, utilizes environmentally-friendly alternative energy, and supplies by-product oxygen by using hydrogen produced through water electrolysis as a power source for the air cleaner.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a flowchart showing a power supply method for an energy-independent water-based pure air cleaning system using a water electrolytic-fuel cell according to an embodiment of the present disclosure.

DETAILED DESCRIPTION

While illustrative embodiments have been illustrated and described, it will be appreciated that various changes can be made therein without departing from the spirit and scope of the invention.

Hereinafter, an embodiment of the present invention will be described in detail with reference to the accompanying drawings.

Figure 1:
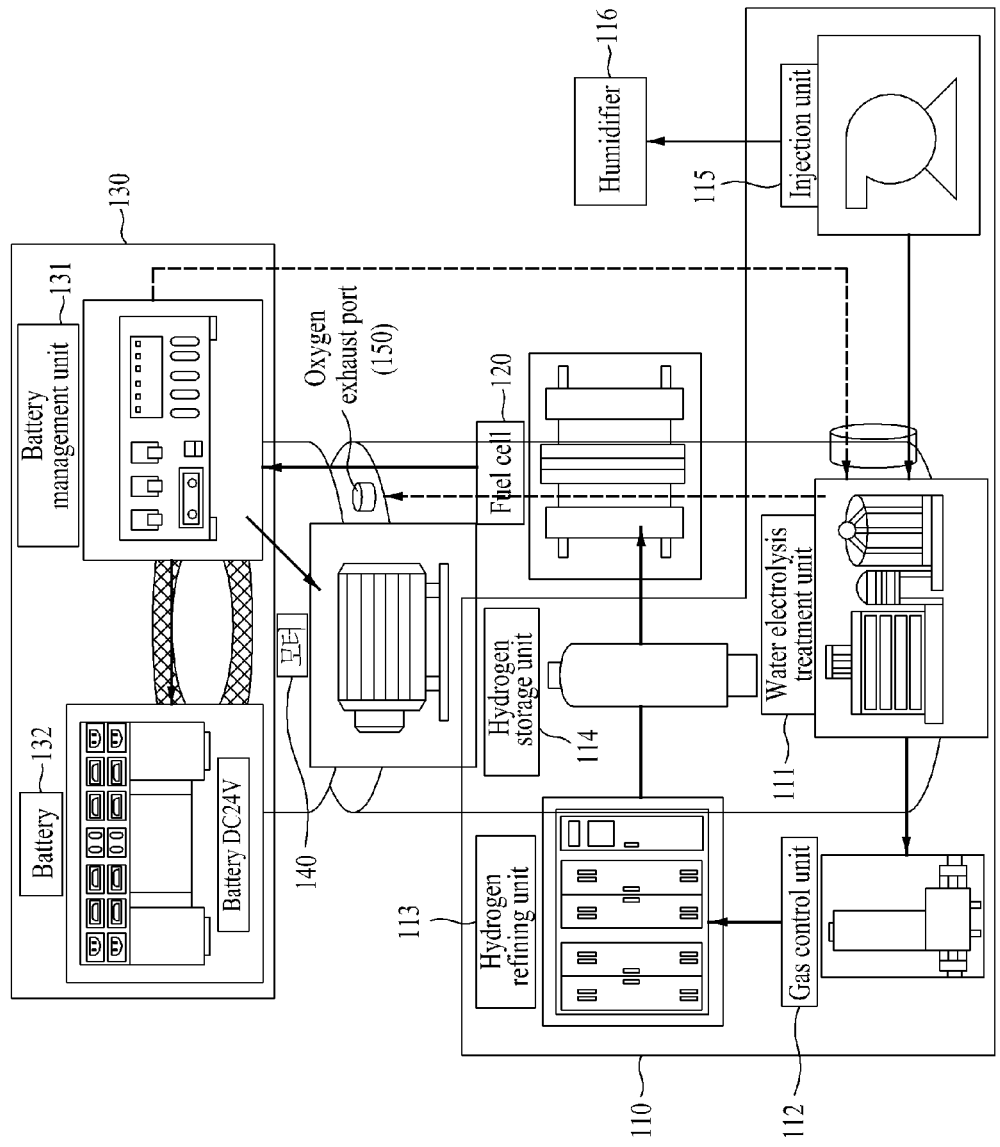
FIG. 1 is a view showing a schematic diagram of an energy-independent water-based pure air cleaning system using a water electrolytic-fuel cell according to an embodiment of the present disclosure.

FIG. 1 is a view showing a schematic diagram of an energy-independent water-based pure air cleaning system using a water electrolytic-fuel cell according to an embodiment of the present disclosure.

Interest in environmentally-friendly alternative energy is growing due to fossil energy depletion and global warming. Notably, hydrogen energy is considered as an alternative to fossil fuels because it produces electrical energy using a fuel cell. Electrolysis of water is a method for the production of hydrogen which uses electricity to decompose water into oxygen and hydrogen.

The present disclosure relates to an energy-independent water-based pure air cleaning system using a water electrolytic-fuel cell which supplies by-product oxygen by using hydrogen produced through water electrolysis as a power source for an air cleaner.

The suggested energy-independent water-based pure air cleaning system using a water electrolytic-fuel cell includes a solar panel (not shown), a water electrolysis treatment unit 110, an energy generating unit (i.e., fuel cell) 120, an energy storage unit 130, a motor 140, and an oxygen exhaust port 150.

The water electrolysis unit 110 generates hydrogen and oxygen through a water electrolysis treatment using supplied water, and supplies hydrogen gas to an energy generating unit by adjusting the pressure of the generated hydrogen gas. The water electrolysis unit 110 includes a water electrolysis treatment unit 111, a gas control unit 112, a hydrogen refining unit 113, a hydrogen storage unit 114, an injection unit 115, and a humidifier 116.

The solar panel (not shown) supplies electric power required at an early stage of the water electrolysis treatment using solar energy and utilizes the same as standby power.

The water electrolysis treatment unit 111 generates oxygen and clean hydrogen gas from filtered and purified water supplied through the water injection unit 115 through hydrogen electrolysis using solar energy.

The gas control unit 112 adjusts the pressure of the hydrogen gas produced through the water electrolysis treatment and supplies the hydrogen gas.

The hydrogen refining unit 113 converts the generated hydrogen into clean hydrogen gas with high purity through a hydrogen refining process using an adsorbent.

The hydrogen storage unit 114 stores the refined hydrogen gas.

The energy generating unit (i.e., fuel cell) 120 generates electrical energy on the basis of the hydrogen gas supplied for use as a power source for air purification. The energy generating unit 120 produces electricity through an electrochemical reaction between oxygen and the hydrogen gas produced through the water electrolysis treatment and converted into clean hydrogen gas with high purity through the hydrogen refining process, by using a fuel cell 120.

The humidifier 116 generates water vapor by spraying or evaporating the supplied water by any one of ultrasonic vibration, heating, natural evaporation, or nozzles to control the humidity in a room.

The energy storage unit 130 includes a battery management unit 131 and a battery 132. The battery management unit 131 does not need energy charging and supplies the generated electrical energy as power for air purification. The energy storage unit 130 includes a best management system (BMS) and an energy storage system (ESS). Also, it stores excess electricity in the battery 132 so as not to need energy charging and so as to enable driving without power supply.

The motor 140 may drive the energy-independent water-based pure air cleaning system shown in FIG. 1 by using power supplied from the energy storage unit 130.

The oxygen exhaust port 150 discharges the oxygen generated in the water electrolysis unit for air purification. In this instance, the oxygen generated in the water electrolysis unit may be discharged via a fan so as to be distributed.

Figure 2:
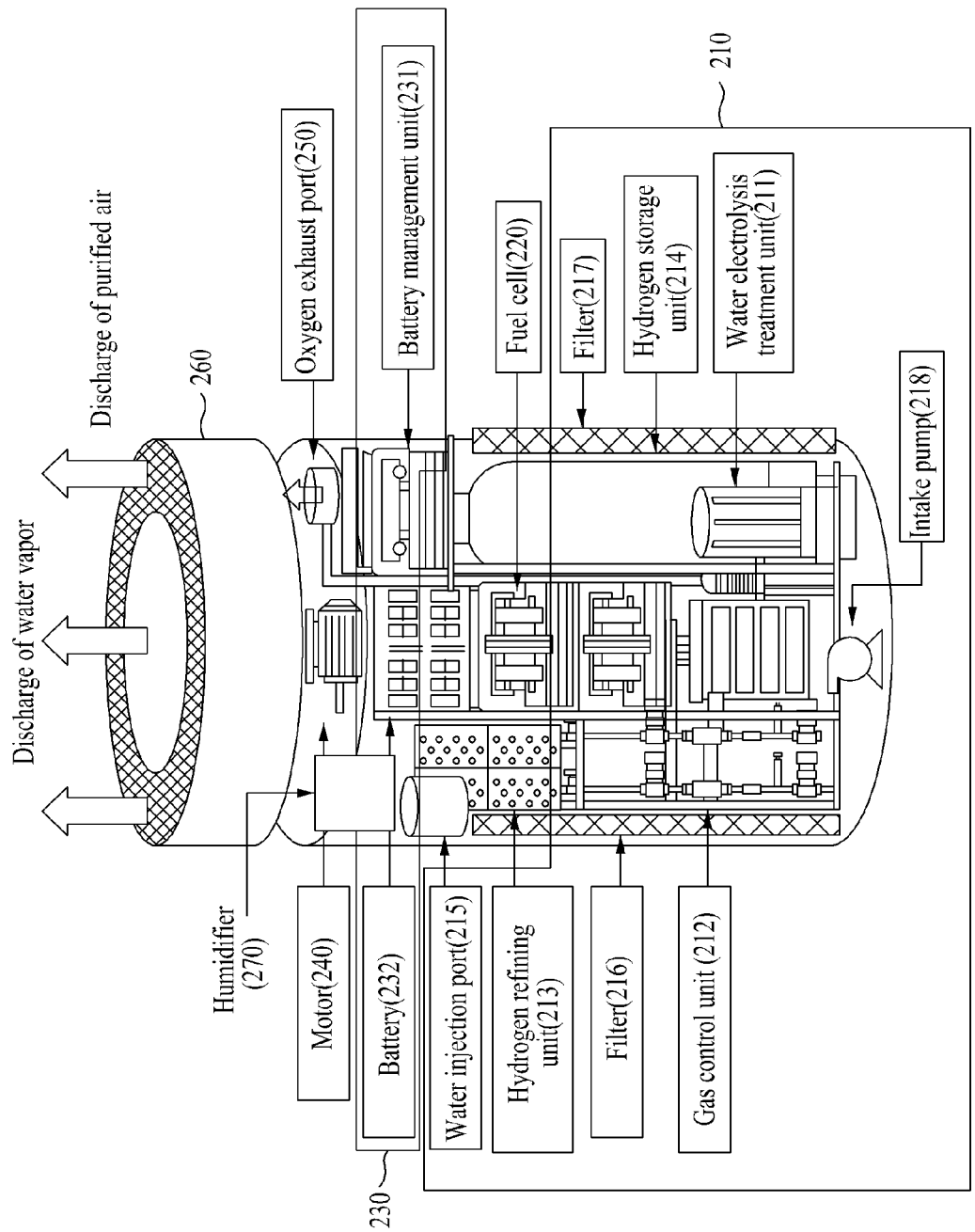
FIG. 2 is a view showing a perspective view of an energy-independent water-based pure air cleaning system using a water electrolytic-fuel cell according to an embodiment of the present disclosure.

FIG. 2 is a view showing a perspective view of an energy-independent water-based pure air cleaning system using a water electrolytic-fuel cell according to an embodiment of the present disclosure.

The suggested energy-independent water-based pure air cleaning system using a water electrolytic-fuel cell includes a solar panel (not shown), a water electrolysis unit 210, an energy generating unit (i.e., fuel cell) 220, an energy storage unit 230, a motor 240, an oxygen exhaust port 250, and a humidifier 270.

The water electrolysis unit 210 generates hydrogen and oxygen through a water electrolysis treatment using supplied water, and supplies hydrogen gas to an energy generating unit by adjusting the pressure of the generated hydrogen gas. The water electrolysis unit 210 includes a water electrolysis treatment unit 211, a gas control unit 212, a hydrogen refining unit 213, a hydrogen storage unit 214, an injection unit 215, filters 216 and 217, and an intake pump 218.

The solar panel (not shown) supplies electric power required at an early stage of the water electrolysis treatment using solar energy and utilizes the same as standby power.

The water electrolysis treatment unit 211 is supplied with water filtered of sediments and purified through the filters 216 and 217. Afterwards, the filtered and purified water is supplied to the water electrolysis treatment unit 211 through the intake pump 218 to generate oxygen and clean hydrogen gas through hydrogen electrolysis using solar energy.

The gas control unit 212 adjusts the pressure of the hydrogen gas produced through the water electrolysis treatment and supplies the hydrogen gas.

The hydrogen refining unit 213 converts the generated hydrogen into clean hydrogen gas with high purity through a hydrogen refining process using an adsorbent.

The hydrogen storage unit 214 stores the refined hydrogen gas.

The energy generating unit (i.e., fuel cell) 220 generates electrical energy on the basis of the hydrogen gas supplied for use as a power source for air purification. The energy generating unit 220 produces electricity through an electrochemical reaction between oxygen and the hydrogen gas produced through the water electrolysis treatment and converted into clean hydrogen gas with high purity through the hydrogen refining process, by using a fuel cell 220.

The energy storage unit 230 includes a battery management unit 231 and a battery 232. The battery management unit 231 does not need energy charging and supplies the generated electrical energy as power for air purification. The energy storage unit 230 includes a best management system (BMS) and an energy storage system (ESS). Also, it stores excess electricity in the battery 232 so as not to need energy charging and so as to enable driving without power supply.

The motor 240 may drive the energy-independent water-based pure air cleaning system shown in FIG. 2 by using power supplied from the energy storage unit 230.

The oxygen exhaust port 250 discharges the oxygen generated in the water electrolysis unit for air purification. The oxygen exhaust port 250 may discharge purified air via a fan 260 so that the oxygen generated in the water electrolysis unit is distributed.

The humidifier 270 generates water vapor by spraying or evaporating the supplied water by any one of ultrasonic vibration, heating, natural evaporation, or nozzles to control the humidity in a room.

FIG. 3 is a flowchart showing a power supply method for an energy-independent water-based pure air cleaning system using a water electrolytic-fuel cell according to an embodiment of the present disclosure.

The suggested power supply method for the energy-independent water-based pure air cleaning system using a water electrolytic-fuel cell includes: the step 310 of generating hydrogen and oxygen through a water electrolysis treatment using water supplied to a water electrolysis unit, and supplying hydrogen gas to an energy generating unit by adjusting the pressure of the generated hydrogen gas; the step 320 of generating electrical energy on the basis of the hydrogen gas supplied to the energy generating unit for use as a power source for air purification; the step 330 of supplying the generated electrical energy as power for air purification through an energy storage unit; the step 341 of discharging the oxygen generated in the water electrolysis unit for air purification through an oxygen exhaust port; and the step 342 of controlling the humidity in a room by using a humidifier that generates water vapor by spraying or evaporating the supplied water by any one of ultrasonic vibration, heating, natural evaporation, or nozzles.

In the step 310, hydrogen and oxygen are generated through a water electrolysis treatment using water supplied to a water electrolysis unit, and hydrogen gas is supplied to an energy generating unit by adjusting the pressure of the generated hydrogen gas.

The water electrolysis unit generates hydrogen and oxygen through a water electrolysis treatment using supplied water, and supplies hydrogen gas to an energy generating unit by adjusting the pressure of the generated hydrogen gas. First of all, the solar panel supplies electric power required at an early stage of the water electrolysis treatment using solar energy and utilizes the same as standby power. The water electrolysis treatment unit generates oxygen and clean hydrogen gas from filtered and purified water supplied through the water injection unit through hydrogen electrolysis using solar energy. The gas control unit adjusts the pressure of the hydrogen gas produced through the water electrolysis treatment and supplies the hydrogen gas. The hydrogen refining unit converts the generated hydrogen into clean hydrogen gas with high purity through a hydrogen refining process using an adsorbent. The hydrogen storage unit stores the refined hydrogen gas.

In the step 320, electrical energy is generated on the basis of the hydrogen gas supplied to the energy generating unit for use as a power source for air purification.

The energy generating unit (i.e., fuel cell) generates electrical energy on the basis of the hydrogen gas supplied for use as a power source for air purification. The energy generating unit produces electricity through an electrochemical reaction between oxygen and the hydrogen gas produced through the water electrolysis treatment and converted into clean hydrogen gas with high purity through the hydrogen refining process, by using a fuel cell.

In the step 330, the generated electrical energy is supplied as power for air purification through an energy storage unit.

The battery management unit does not need energy charging and supplies the generated electrical energy as power for air purification. The energy storage unit includes a best management system (BMS) and an energy storage system (ESS), and stores excess electricity in the battery so as not to need energy charging and so as to enable driving without power supply.

In the step 341, the oxygen generated in the water electrolysis unit is discharged for air purification through an oxygen exhaust port.

The motor may drive the energy-independent water-based pure air cleaning system by using power supplied from the energy storage unit. The oxygen exhaust port discharges the oxygen generated in the water electrolysis unit for air purification. In this instance, the oxygen generated in the water electrolysis unit may be discharged via a fan so as to be distributed.

In the step 342, the humidity in a room is controlled by using a humidifier that generates water vapor by spraying or evaporating the supplied water by any one of ultrasonic vibration, heating, natural evaporation, or nozzles.

The system described herein may be implemented using hardware components, software components, and/or a combination thereof. For example, the system and the components described herein may be implemented using one or more general-purpose or special purpose computers or processing devices, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include computer programs, code, instructions or one or more combinations thereof, and may configure a processing device to operate in a desired manner or may independently or collectively control the processing device. The software and/or data may be embodied in any type of machine, components, physical equipment, virtual equipment, or computer storage media or units so as to be interpreted by the processing device or to provide instructions or data to the processing device. The software may be dispersed throughout a networked computer system and stored or executed in a dispersion manner. The software and data may be recorded in one or more computer-readable storage media.

The method according to the above-described embodiments may be implemented with program instructions which may be executed through various computer means, and may be recorded in computer-readable media. The computer-readable media may also include, alone or in combination, the program instructions, data files, data structures, and the like. The program instructions recorded on the media may be those specially designed and constructed for the purposes of example embodiments, or they may be of the kind well-known and available to those skilled in the field of computer software. Examples of the computer-readable recording media may include magnetic media such as hard disks, floppy disks, and magnetic tapes, optical media such as CD-ROMs and DVDs, magneto-optical media such as floptical disks, and hardware devices specially configured to store and perform program instructions, such as ROM (ROM), random access memory (RAM), and flash memory. Examples of the program instructions may include machine-language code, such as code written by a compiler, and high-level language code executable by a computer using an interpreter.

As described above, although the embodiments have been described in connection with the limited embodiments and the drawings, those skilled in the art may modify and change the embodiments in various ways from the description. For example, proper results may be achieved although the aforementioned descriptions are performed in a different order from that of the described method and/or the aforementioned elements, such as the system, configuration, device, and circuit, are coupled or combined in a form different from that of the described method, or replaced or substituted with other elements or equivalents.

Accordingly, other implementations, other embodiments, and equivalents of the claims fall within the scope of the claims.

The embodiments of the invention in which an exclusive property or privilege is claimed are defined as follows:

1. An energy-independent water-based pure air cleaning system using a water electrolytic-fuel cell, the energy-independent water-based pure air cleaning system being configured to perform air purification and to control humidity in a room without external power being supplied, the system comprising:
   a water electrolysis unit that generates hydrogen and oxygen through a water electrolysis treatment using supplied water, and supplies hydrogen gas to an energy generating unit by adjusting the pressure of the generated hydrogen gas;
   the energy generating unit that generates electrical energy on the basis of the hydrogen gas supplied for use as a power source for air purification;
   an energy storage unit that does not need energy charging and supplies the generated electrical energy as power for air purification;
   an oxygen exhaust port for discharging the oxygen generated in the water electrolysis unit for air purification in a room;
   a humidifier that generates water vapor by spraying or evaporating the supplied water by any one of ultrasonic vibration, heating, natural evaporation, or nozzles to control the humidity in the room; and
   a fan for simultaneously discharging the oxygen generated in the water electrolysis unit and the water vapor generated in the humidifier to the room for the air purification and the control of the humidity in the room;

wherein the oxygen exhaust port and the humidifier are disposed beneath the fan, and the oxygen from the oxygen exhaust port and the water vapor from the humidifier are discharged together through the fan;

wherein the water electrolysis unit comprises:
- a solar panel for supplying electric power required for initial operation of the water electrolysis treatment using solar energy and utilizing the same as standby power;
- a water electrolysis treatment unit for generating oxygen and hydrogen gas from filtered and purified water through hydrogen electrolysis using solar energy;
- a gas control unit for adjusting the pressure of the hydrogen gas produced through the water electrolysis treatment and supplying the hydrogen gas;
- a hydrogen refining unit for converting the generated hydrogen into clean hydrogen gas with high purity through a hydrogen refining process using an adsorbent; and
- a hydrogen storage unit for storing the refined hydrogen gas;

wherein the energy generating unit produces electricity through an electrochemical reaction between oxygen and the clean hydrogen gas with high purity through the hydrogen refining process, by using a fuel cell; and wherein the water electrolysis unit comprises:
- an injection unit for receiving untreated water;
- a filter disposed below the injection unit and at a side portion of the energy-independent water-based pure air cleaning system, for filtering and purifying the untreated water; and
- an intake pump disposed on a bottom of the energy-independent water-based pure air cleaning system, for supplying the filtered and purified water to the water electrolysis treatment unit.

* * * * *